United States Patent
Dunstan et al.

(10) Patent No.: US 9,766,674 B2
(45) Date of Patent: Sep. 19, 2017

(54) USB POWER DELIVERY CONTROLLER SHARING

(71) Applicants: Robert Dunstan, Forest Grove, OR (US); Chee Lim Nge, Hillsboro, OR (US)

(72) Inventors: Robert Dunstan, Forest Grove, OR (US); Chee Lim Nge, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 171 days.

(21) Appl. No.: 14/318,198

(22) Filed: Jun. 27, 2014

(65) Prior Publication Data
US 2015/0378409 A1  Dec. 31, 2015

(51) Int. Cl.
*G06F 1/26* (2006.01)
*G06F 13/38* (2006.01)

(52) U.S. Cl.
CPC ............ *G06F 1/266* (2013.01); *G06F 13/385* (2013.01); *Y02B 60/1228* (2013.01); *Y02B 60/1235* (2013.01)

(58) Field of Classification Search
CPC . G06F 1/26; G06F 1/263; G06F 1/266; G06F 13/36
USPC ........................................................ 713/300
See application file for complete search history.

(56) References Cited

U.S. PATENT DOCUMENTS

| | | | |
|---|---|---|---|
| 6,148,002 A * | 11/2000 | Patel ................. | H04L 29/06 370/438 |
| 6,618,580 B2 | 9/2003 | Parrott et al. | |
| 2003/0054703 A1* | 3/2003 | Fischer ................. | H02J 7/0027 439/894 |
| 2011/0131428 A1* | 6/2011 | Diab ..................... | G06F 1/3209 713/300 |
| 2011/0208980 A1 | 8/2011 | Brooks et al. | |
| 2011/0283025 A1* | 11/2011 | Maxwell ............... | G06F 3/0607 710/16 |
| 2011/0298426 A1* | 12/2011 | Hussain ................ | H02J 7/0057 320/128 |
| 2012/0078690 A1* | 3/2012 | Harriman ........... | G06Q 30/0241 705/14.4 |
| 2012/0173910 A1* | 7/2012 | Ballantyne .............. | G06F 1/266 713/340 |

(Continued)

FOREIGN PATENT DOCUMENTS

TW           201138256 A        11/2011

OTHER PUBLICATIONS

International Search Report for PCT Application No. PCT/US2015/032688, dated Aug. 19, 2015, 3 pages.

(Continued)

*Primary Examiner* — Vincent Tran
(74) *Attorney, Agent, or Firm* — International IP Law Group, P.L.L.C.

(57) ABSTRACT

A system for sharing a power delivery controller is described herein. The system includes a plurality of ports and a power delivery controller communicatively coupled to the plurality of ports. The power delivery controller is to send a first message to a particular port of the plurality of ports and remain connected to the particular port and enable power delivery to the particular port in response to a particular return message from the port.

20 Claims, 9 Drawing Sheets

200

(56) References Cited

U.S. PATENT DOCUMENTS

| | | | |
|---|---|---|---|
| 2012/0198119 A1* | 8/2012 | Johnson | G06F 13/4022 710/312 |
| 2013/0013936 A1* | 1/2013 | Lin | G06F 1/266 713/300 |
| 2013/0234677 A1* | 9/2013 | Mok | H02J 7/0052 320/164 |
| 2013/0290765 A1* | 10/2013 | Waters | G06F 1/266 713/340 |
| 2013/0320942 A1* | 12/2013 | Vemula | G05F 1/573 323/274 |
| 2013/0339769 A1* | 12/2013 | Waters | G06F 1/266 713/310 |
| 2014/0095899 A1 | 4/2014 | Sultenfuss et al. | |
| 2014/0173141 A1 | 6/2014 | Waters | |
| 2014/0208134 A1* | 7/2014 | Waters | G06F 1/266 713/310 |
| 2015/0021995 A1* | 1/2015 | Chang | G06F 1/266 307/31 |
| 2015/0249393 A1* | 9/2015 | Zhang | H02M 3/33523 363/21.15 |
| 2015/0362984 A1* | 12/2015 | Waters | G06F 1/3287 713/324 |

OTHER PUBLICATIONS

R.O.C. Search Report, Patent Application No. 104116687, dated Aug. 26, 2016, 2 pages.

* cited by examiner

200

USB POWER DELIVERY CONTROLLER SHARING

TECHNICAL FIELD

This disclosure relates generally to a Universal Serial Bus (USB) power delivery. More specifically, a system is described in which a power delivery controller is shared between a plurality of ports.

BACKGROUND ART

The USB Power Delivery Specification (USB Power Delivery Specification, Revision 1.0, dated Jun. 26, 2013) defines a protocol wherein USB components are used to power a variety of devices. The USB Power Delivery Specification also describes the communication between the devices over a power delivery cable. In some cases, communications according to the USB Power Delivery Specification can be used to transmit power of up to one hundred watts (W).

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
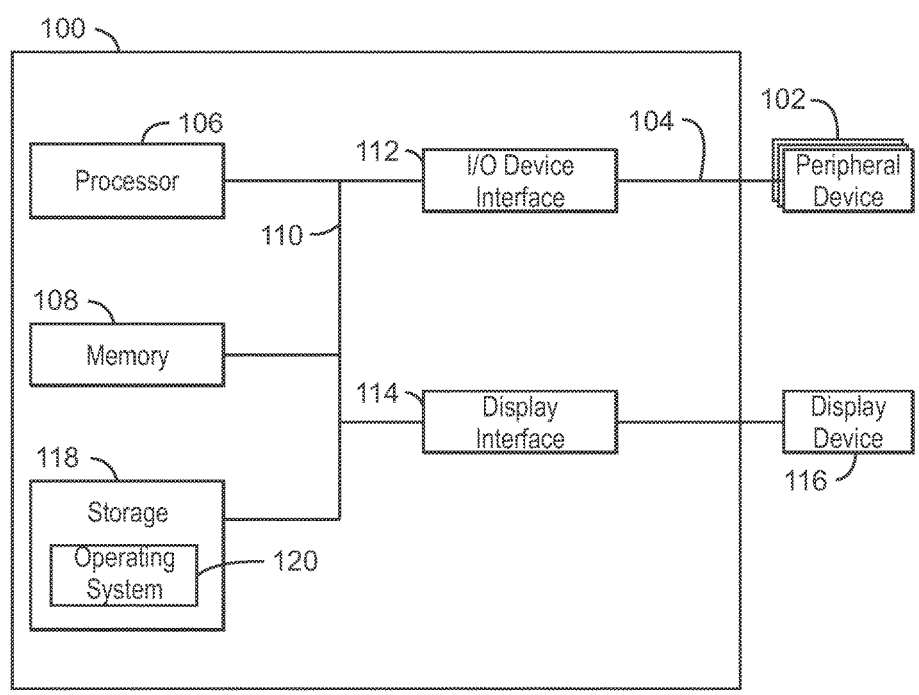
FIG. 1 is a block diagram of system including a first device communicatively coupled to a second device via a cable.

The USB Power Delivery Specification defines port to port communications and a power delivery system whereby a port can advertise its capabilities and other ports can request these capabilities. In some cases, the capabilities include voltage, current, and power direction. Power direction can refer to the ability to use a particular port on the notebook as the input from a charger. Power direction is most often implemented by a USB Power Delivery (PD) controller. The USB PD controller is a relatively expensive component. Furthermore, ports of a computing device are expected to behave in a similar fashion, and each computing device may include several ports. As a result, computing devices often include several USB PD controllers, such that one USB PD Controller corresponds to one USB port. In this manner, each port will behave the same with regard to power delivery. However, adding several PD controllers to a computing device is costly. Additionally, supporting USB PD charging on one of several ports within a computing device is not desirable.

Embodiments described herein disclose sharing a USB PD controller. In embodiments, the USB PD controller is shared between a plurality of USB ports. Accordingly, the USB PD controller can support multiple USB ports. Moreover, the USB PD controller takes advantage of the capabilities and messages sent by the ports as required by the USB PD specification to enable sharing of the USB PD controller. In this manner, any USB port of a computing system can be used to charge a peripheral device, with a single USB PD controller included in the computing device. The present techniques can be used with any USB version, both those now developed or developed in the future.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present techniques. It will be apparent, however, to one skilled in the art that these specific details need not be employed to practice the present techniques. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present techniques.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the present techniques described herein.

FIG. 1 is a block diagram of system including a first device 100 communicatively coupled to a second device 102 via a cable 104. The cable 104 may include electronic components integrated within the cable 104. The cable 104 may be configured to provide a signal from the first device 100 to the second device 102. The cable 104 may also be configured to provide a data signal from the first device 100 to the second device 102. In some cases, the cable 104 may be configured to enable the transmission of power between the first device 100 and the second device 102. The first device 100 may be a host computing device, for example, a laptop computer, desktop computer, tablet computer, mobile device, server, or cellular phone, among others. Moreover, the second device may be a host computing device, for example, a laptop computer, desktop computer, tablet computer, mobile device, server, or cellular phone, among others. The first device 100 may include a processor 106 that is adapted to execute stored instructions, as well as a memory device 108 that stores instructions that are executable by the processor 106. The processor 106 can be a single core processor, a multi-core processor, a computing cluster, or any number of other configurations. The processor 106 may be implemented as Complex Instruction Set Computer (CISC) or Reduced Instruction Set Computer (RISC) processors, x86 Instruction set compatible processors, multi-core, or any other microprocessor or central processing unit (CPU). In some embodiments, the processor 106 includes dual-core processor(s), dual-core mobile processor(s), or the like.

The memory device 108 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems. The instructions stored in the memory device 108 and that are executed by the processor 106 may be used to provide power to the second device 102, and power to electronic components (not shown) integrated in the cable 104.

The processor 106 may be connected through a system bus 110 (e.g., PCI, ISA, PCI-Express, HyperTransport®, NuBus, etc.) to an input/output (I/O) device interface 112 adapted to connect the first device 100 to a second device 102 via the cable 104. In some cases, the I/O device interface 112 is a USB subsystem that includes a USB power delivery (PD) controller. The first device 100 may include several ports to attach a plurality of peripheral devices 102. The plurality of peripheral devices 102 can share the PD controller within the USB subsystem.

As noted above, the second device may be a host computing device, for example, a laptop computer, desktop computer, tablet computer, mobile device, server, or cellular phone, among others. Thus, the second device 102 may be a host computing device similar to the first device 100. The second device 102 may also be a peripheral device and may include, for example, a keyboard and a pointing device, wherein the pointing device may include a touchpad or a touchscreen, a peripheral device such as a camera, a media player, a printer, among others. The second device 102 could also be a display device. The I/O device interface 112 may be configured to transmit power via the cable 104, and may be configured to provide power to the second device 102 via a device power line. In some cases, the second device 102 provides power to the first device via the cable 104.

The processor 106 may also be linked through the system bus 110 to a display interface 114 adapted to connect the first device 100 to a display device 116. The display device 116 may include a display screen that is a built-in component of the first device 100. The display device 116 may also include a computer monitor, television, or projector, among others, that is externally connected to the first device 100.

The first device 100 may also include a storage device 118. The storage device 118 may include a physical memory such as a hard drive, an optical drive, a flash drive, an array of drives, or any combinations thereof. The storage device 118 may also include remote storage drives. The storage device 118 may also include an operating system 120. The storage device 118 may store instructions thereon to share a power delivery controller between ports of the first device 100. Although not shown in FIG. 1, the cable 104 may have an internal power line integrated within the cable 104 to provide power to the integrated electronic components, and a device power line integrated within the cable 104 to provide power from the first device 100 to the second device 102.

In some embodiments, the first device and the second device may each include a power source. The power source of the first device, the second device, or both may provide power to the other device when necessary. In some embodiments, the voltage provided to the other device may be fixed. In this manner, a fixed voltage may be applied to the device receiving power. In other embodiments, the voltage provided to the device receiving power may be dynamic based on the power requirements of the device receiving power at any given time.

Figure 2:
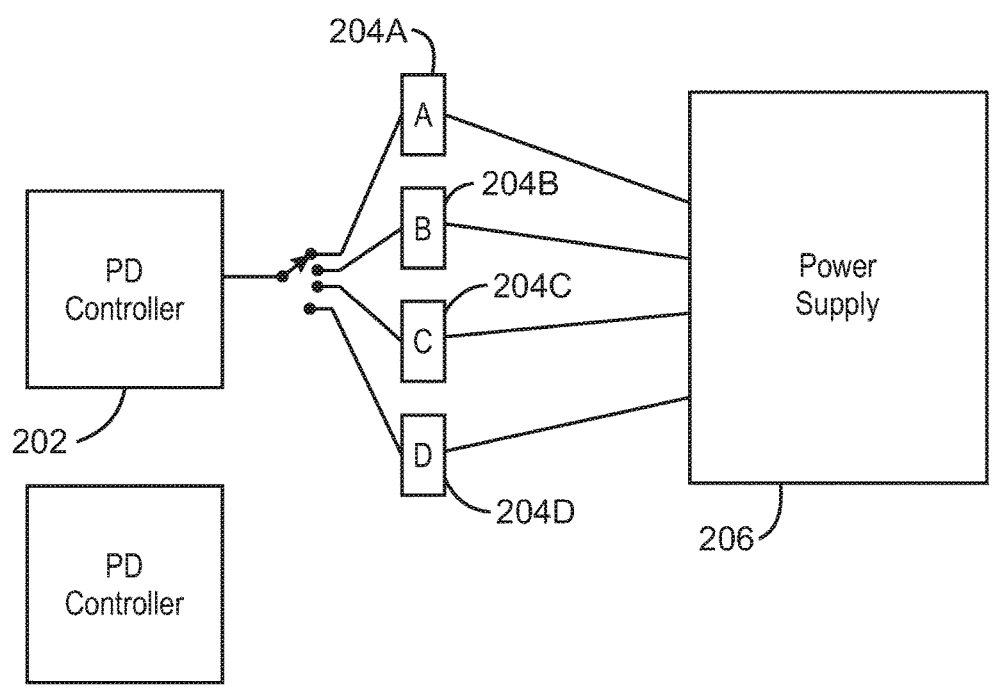
FIG. 2 is a block diagram of a USB subsystem that includes a power delivery (PD) controller.

FIG. 2 is a block diagram of a USB subsystem 200 that includes a PD controller 202. A plurality of ports 204A, 204B, 204C, and 204D each share access to the PD controller 202. Each of the plurality of ports 204A, 204B, 204C, and 204D are coupled to a power supply 206. Accordingly, each of the plurality of ports 204A, 204B, 204C, and 204D can access power from the power supply 206 and provide power to a peripheral device.

In some cases, the USB subsystem 202 is included in a hot device. A hot device may be a device that is able to be connected and disconnected without shutting down an associated system or device. In examples, a hot device can be connected or disconnected without any significant changes to the device. The PD Controller 202 may rotate between the plurality of ports 204A, 204B, 204C, and 204D, one port at a time. When the PD controller 202 arrives at a port of the plurality of ports 204A, 204B, 204C, and 204D, it can send any message that generates a response from the port. The message may be a Ping or a Capabilities message. In some cases, a negotiation process may occur whereby the PD controller advertises the capabilities of the computing device. For example, the PD controller may send a Source Capabilities message. In the event that a device is connected to the port, the device may request an advertised capability.

According to the USB Power Delivery Specification, all USB PD devices are required to respond to a Capabilities message. In examples, if the message is responded to with any return message that is a call for power, the USB PD controller remains attached to the port for a period of time. In some cases, the period of time is during a active connection between the USB PD controller and the port. During the connection, the PD controller can communicate with the device in order to determine the capabilities of the device. If the device connected to the port is a USB PD device, then power can be transmitted according to the USB Power Delivery Specification.

For example, a Good Cyclic Redundancy Check (GoodCRC) message and/or Request message may be returned in response to a Capabilities message. Accordingly, when the GoodCRC message and/or Request message is received, the USB PD controller remains attached to the port for the duration of the connection. The GoodCRC message indicates that the message from the port was correctly received. The Request message indicates a request for power. Both the GoodCRC message and the Request message create a connection between the PD controller and the port. After the connection is detected by the PD controller, the PD power source is connected to that port and remains connected for the duration of the connection.

Further, during the connection, the USB PD controller can implement messaging according to the USB Power Delivery Specification. For example, Capability Timers can be used to determine the attachment of a power delivery capable device to a port of the computing device. Power supply timers may also be used. Further, a Device Policy Manager can be implemented to manage power used by one or more USB Power Delivery ports.

Figure 3:
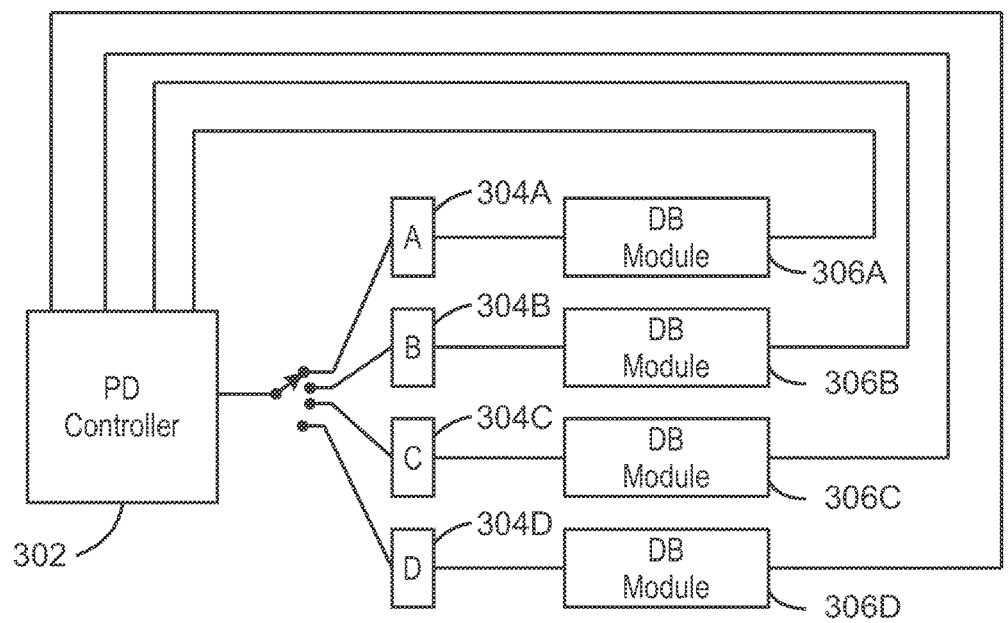
FIG. 3 is a block diagram of a USB subsystem that includes a PD controller and a plurality of dead battery (DB) modules.

In some cases, ports can be rotated through in a controlled fashion. For example, a PD controller can rotate through all ports of the plurality of ports in order to determine which port will have access to the PD controller. A PD controller may also rotate through a subset of ports of the plurality of ports. In some cases, the subset of ports are only ports where a cable is present in the receptacle. Thus, the plurality of ports is a group of ports connected to a plurality of cables. Additionally, in some cases, the subset of ports are only ports with a device connected to the other end of the cable. In this case, the plurality of ports is a group of ports connected to a device plurality of devices FIG. 3 is a block diagram of a USB subsystem 300 that includes a PD controller 302 and a plurality of dead battery (DB) modules 306. The dead battery modules described herein may also be referred to as unpowered modules. In some examples, the USB subsystem 300 can be included in a device such as a laptop computer, desktop computer, and the like. The USB subsystem 300 may be within a system that is Provider/Consumer device, and can include a plurality of Provider/Consumer ports 304A, 304B, 304C, and 304D that it can use to charge batteries. In other words, the ports 304A, 304B, 304C, and 304D may each be a provider of power with the capability to act as a consumer. Each port of the plurality of ports 304A, 304B, 304C, and 304D is coupled with a corresponding dead battery (DB) module 306A, 306B, 306C, and 306D. The DB module can be used to supply power to a device including the USB subsystem 300 when the device has a dead battery in need of charging, or the device has lost its power source.

The plurality of DB modules 306A, 306B, 306C, and 306D are connected to a VBus of the USB subsystem 300. Each of the plurality of DB modules 306A, 306B, 306C, and 306D can operate from the VBus when the power is off or disrupted to a system including the USB subsystem 300. In some cases, the system power is off when a battery has no remaining power of the system is in an unpowered condition. A device may be connected to any of ports 304A, 304B, 304C, and 304D. The device may be a mobile phone, tablet device, and the like. Typically, the device is a Consumer/Provider. In other words, the device may be a consumer of power with the capability to act as a provider. When the device does not detect any voltage on Vbus, the device may periodically apply a small voltage to the VBus to power the system including the USB subsystem 300, and thus the ports 304A, 304B, 304C, and 304D are used to consume power. The voltage applied to Vbus is enough to power the USB Power Delivery communications capability of the USB subsystem 300. As a result, a role reversal can be established between the device including the USB subsystem 300 and the device connected through a port of the USB subsystem 300. In this case, the USB subsystem 300 becomes a consumer, and the device connected through a port of the USB subsystem 300 becomes a provider.

The DB or unpowered module coupled with a device through a port, such as the Provider/Consumer ports above, can use the limited voltage on $V_{bus}$ to output a bitstream. This bitstream is used for negotiation purposes when the role reversal is established between the two devices. The bit stream may be a repeating bit pattern, such as a continuous stream of alternating '0s' and '1s.' However, in some cases, the bit stream used to negotiate back charging by the device may be another repeating bit pattern that indicates the device is to provide power.

When the bit stream is present, the small voltage on $V_{bus}$ is used to charge the system and power generation of the bit stream for signaling purposes. The DB module continues outputting that bitstream until the system is ready to begin normal USB PD communications. The system is ready to begin normal USB PD communications when charging of the system has reached a particular level. In some cases, the system is ready to begin normal USB PD communications when the PD controller can send a source capabilities message to the device.

The DB module emulates a minimal portion of a USB PD controller necessary to support dead battery operation. In some cases, the DB or unpowered module is approximately a twenty-three megahertz (MHz) source that is modulated at approximately a three hundred kilohertz (KHz) rate to drive a six hundred kilohertz (KHz) frequency shift. In operation, the twenty-three megahertz source is all that is needed to complete dead battery operations. This twenty-three megahertz source is interpreted as a bit-stream by a power delivery engine by the device providing power. In this manner, the entire power delivery controller is not allocated for each port in order to support dead battery operation in a device in which a single PD controller is shared amongst a plurality of ports. System costs can be reduced by reducing the number of power delivery controllers present in a system. In embodiments, the presence of a vSafe5V signal from a plurality of ports can be detected when implementing dead battery operations. The port sending the vSafe5V signal can be used to provide power to the system until power delivery communications can resume.

Figure 4:
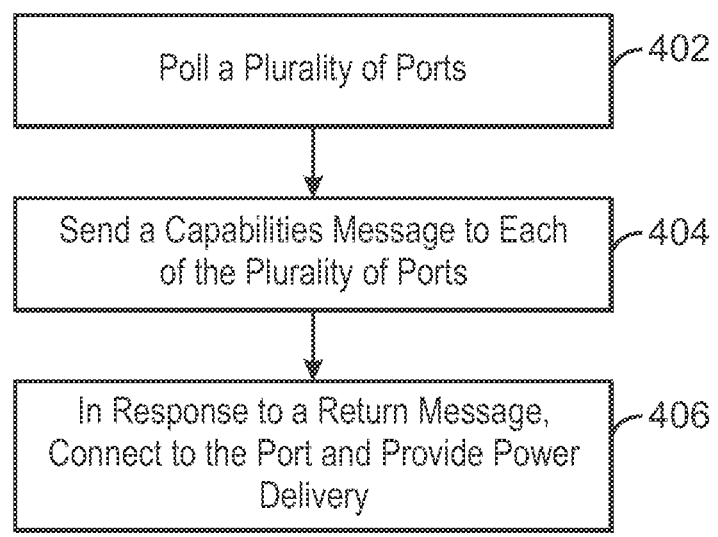
FIG. 4 is a block diagram of a method for sharing a power delivery controller.

FIG. 4 is a block diagram of a method 400 for sharing a power delivery controller. At block 402, the PD controller may poll or scan a plurality of ports. The PD can poll all of the USB ports within a computing device, or the PD controller can poll a subset of the USB ports of a device. The USB ports can be those ports that a cable is connected to. In some cases, the subset of ports can be those ports that have a device attached to a cable connected to the port. At block 404, a message is sent to each of the plurality of ports. In some cases, the message is a Ping or a Capabilities message At block 404, in response to a return message, the PD controller may connect to the port and provide power delivery services to the port. The return message may be a GoodCRC message, where the GoodCRC message indicates that the port is correctly received the message. The return message may also be a Request message, which indicates the port is requesting power. The return message can be used to establish an active connection with the PD controller so that power is transmitter according to the USB Power Delivery Specification.

In some embodiments, a system may include a plurality of PD controllers for scalability purposes. For example, a first PD controller may be scan port A, port B, and port C of a system to establish power delivery, and a second PD controller may be scan to ports D and port E of the same system to establish power delivery. In another example a first PD controller may scan each of port A, port B, port C, port D, and port E of a system. Upon the first PD controller establishing an active connection with one of port A, port B, port C, port D, or port E, the second PD controller may begin to scan other ports not involved in the active connection with the first PD controller.

Figure 5:
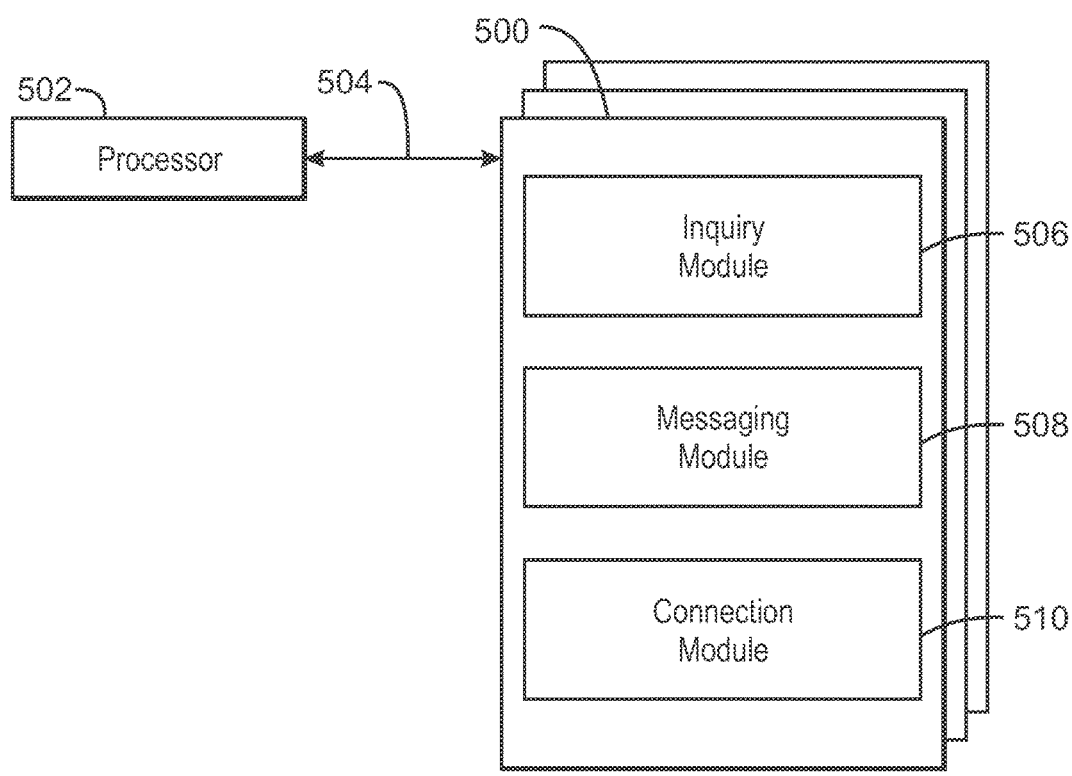
FIG. 5 is a block diagram showing tangible, non-transitory computer-readable media 500 that stores code for sharing a power delivery controller.

FIG. 5 is a block diagram showing tangible, non-transitory computer-readable media 500 that stores code for sharing a power delivery controller. The tangible, non-transitory computer-readable media 500 may be accessed by a processor 502 over a computer bus 504. Furthermore, the tangible, non-transitory computer-readable medium 500 may include code configured to direct the processor 502 to perform the methods described herein.

The various software components discussed herein may be stored on one or more tangible, non-transitory computer-readable media 500, as indicated in FIG. 5. For example, an inquiry module 506 may be configured to poll a plurality of ports of the computing device. In some cases, the plurality of ports is a subset of the available ports of the computing device. A messaging module 508 may be configures to sent a message to each of the plurality of ports. A connection module 510 may be configured to couple with a port of the plurality of ports based on a return message for a port.

The block diagram of FIG. 5 is not intended to indicate that the tangible, non-transitory computer-readable media 500 is to include all of the components shown in FIG. 5. Further, the tangible, non-transitory computer-readable media 500 may include any number of additional components not shown in FIG. 5, depending on the details of the specific implementation.

Figure 6:
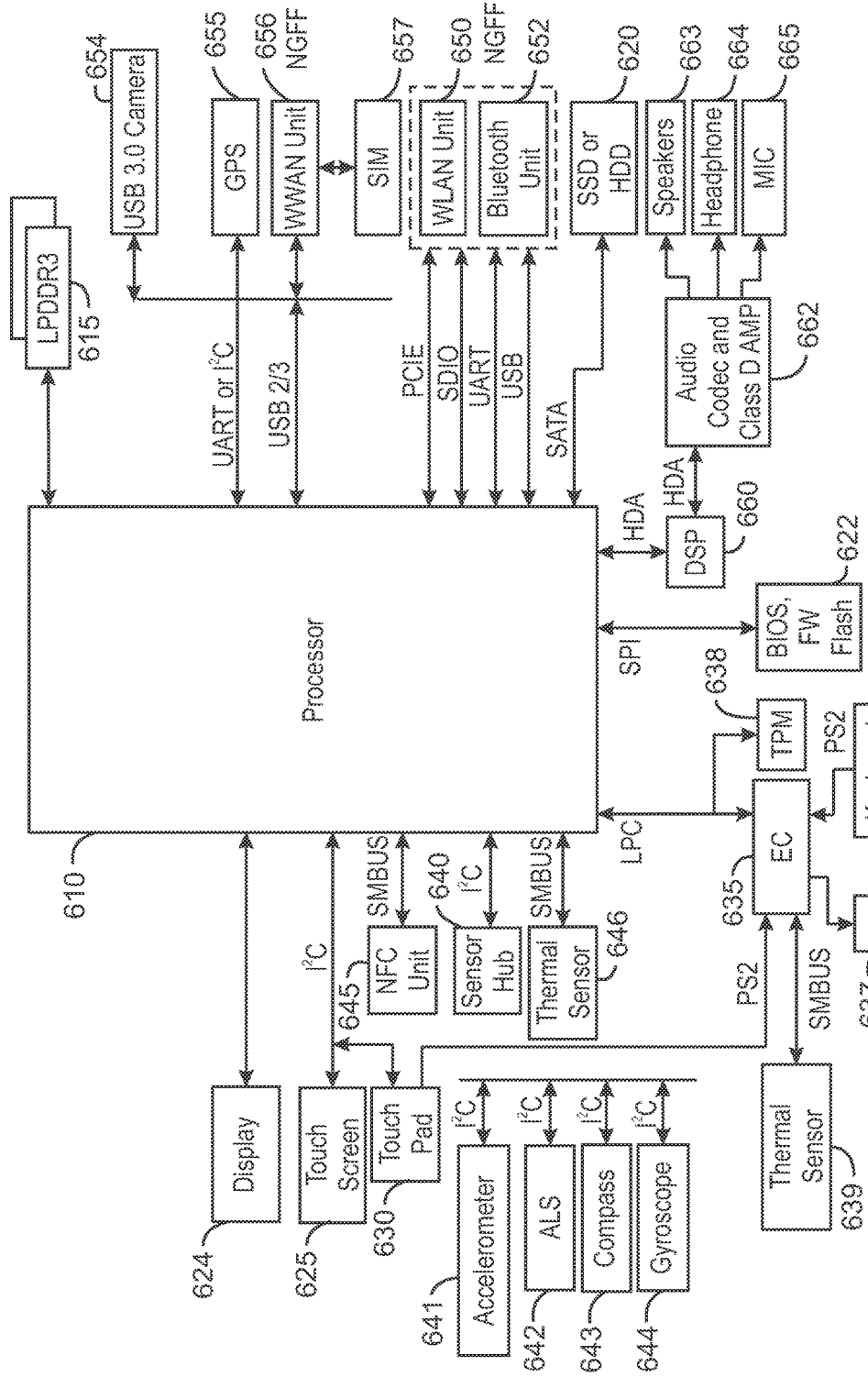
FIG. 6 is a block diagram of components present in a computer system in accordance with an embodiment of the present techniques.

Referring now to FIG. 6, a block diagram of components present in a computer system in accordance with an embodiment of the present techniques is illustrated. As shown in FIG. 6, system 600 includes any combination of components. These components may be implemented as ICs, portions thereof, discrete electronic devices, or other modules, logic, hardware, software, firmware, or a combination thereof adapted in a computer system, or as components otherwise incorporated within a chassis of the computer system. Note also that the block diagram of FIG. 6 is intended to show a high level view of many components of the computer system. However, it is to be understood that some of the components shown may be omitted, additional components may be present, and different arrangement of the components shown may occur in other implementations. As a result, the present techniques described above may be implemented in any portion of one or more of the interconnects illustrated or described below. Although the present techniques are described using a Universal Serial Bus protocol, any of the interconnects below can implement a single power delivery controller as described herein. Further, the components in the system 600 can be powered using a power delivery controller.

As seen in FIG. 6, a processor 610, in one embodiment, includes a microprocessor, multi-core processor, multi-threaded processor, an ultra low voltage processor, an embedded processor, or other known processing element. In the illustrated implementation, processor 610 acts as a main processing unit and central hub for communication with many of the various components of the system 600. As one example, processor 600 is implemented as a system on a chip (SoC). As a specific illustrative example, processor 610 includes an Intel® Architecture Core™-based processor such as an i3, i5, i7 or another such processor available from Intel Corporation, Santa Clara, Calif. However, understand that other low power processors such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters may instead be present in other embodiments such as an Apple A5/A6 processor, a Qualcomm Snapdragon processor, or TI OMAP processor. Note that many of the customer versions of such processors are modified and varied; however, they may support or recognize a specific instructions set that performs defined algorithms as set forth by the processor licensor. Here, the microarchitectural implementation may vary, but the architectural function of the processor is usually consistent. Certain details regarding the architecture and operation of processor 610 in one implementation will be discussed further below to provide an illustrative example.

Processor 610, in one embodiment, communicates with a system memory 615. As an illustrative example, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices may be of different package types such as single die package (SDP), dual die package (DDP) or quad die package (Q17P). These devices, in some embodiments, are directly soldered onto a motherboard to provide a lower profile solution, while in other embodiments the devices are configured as one or more memory modules that in turn couple to the motherboard by a given connector. And of course, other memory implementations are possible such as other types of memory modules, e.g., dual inline memory modules (DIMMs) of different varieties including but not limited to microDIMMs, MiniDIMMs. In a particular illustrative embodiment, memory is sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage 620 may also couple to processor 610. In various embodiments, to enable a thinner and lighter system design as well as to improve system responsiveness, this mass storage may be implemented via a SSD. However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 6, a flash device 622 may be coupled to processor 610, e.g., via a serial peripheral interface (SPI). This flash device may provide for non-volatile storage of system software, including a basic input/output software (BIOS) as well as other firmware of the system.

In various embodiments, mass storage of the system is implemented by a SSD alone or as a disk, optical or other drive with an SSD cache. In some embodiments, the mass storage is implemented as a SSD or as a HDD along with a restore (RST) cache module. In various implementations, the HDD provides for storage of between 320 GB-4 terabytes (TB) and upward while the RST cache is implemented with a SSD having a capacity of 24 GB-256 GB. Note that such SSD cache may be configured as a single level cache (SLC) or multi-level cache (MLC) option to provide an appropriate level of responsiveness. In an SSD-only option, the module may be accommodated in various locations such as in a mSATA or NGFF slot. As an example, an SSD has a capacity ranging from 120 GB-1 TB.

Various input/output (IO) devices may be present within system 600. Specifically shown in the embodiment of FIG. 6 is a display 624 which may be a high definition LCD or LED panel configured within a lid portion of the chassis. This display panel may also provide for a touch screen 625, e.g., adapted externally over the display panel such that via a user's interaction with this touch screen, user inputs can be provided to the system to enable desired operations, e.g., with regard to the display of information, accessing of information and so forth. In one embodiment, display 624 may be coupled to processor 610 via a display interconnect that can be implemented as a high performance graphics interconnect. Touch screen 625 may be coupled to processor 610 via another interconnect, which in an embodiment can be an I²C interconnect. As further shown in FIG. 6, in addition to touch screen 625, user input by way of touch can also occur via a touch pad 630 which may be configured within the chassis and may also be coupled to the same I²C interconnect as touch screen 625.

The display panel may operate in multiple modes. In a first mode, the display panel can be arranged in a transparent state in which the display panel is transparent to visible light. In various embodiments, the majority of the display panel may be a display except for a bezel around the periphery. When the system is operated in a notebook mode and the display panel is operated in a transparent state, a user may view information that is presented on the display panel while also being able to view objects behind the display. In addition, information displayed on the display panel may be viewed by a user positioned behind the display. Or the operating state of the display panel can be an opaque state in which visible light does not transmit through the display panel.

In a tablet mode the system is folded shut such that the back display surface of the display panel comes to rest in a position such that it faces outwardly towards a user, when the bottom surface of the base panel is rested on a surface or held by the user. In the tablet mode of operation, the back display surface performs the role of a display and user interface, as this surface may have touch screen functionality and may perform other known functions of a conventional touch screen device, such as a tablet device. To this end, the display panel may include a transparency-adjusting layer that is disposed between a touch screen layer and a front display surface. In some embodiments the transparency-adjusting layer may be an electrochromic layer (EC), a LCD layer, or a combination of EC and LCD layers.

In various embodiments, the display can be of different sizes, e.g., an 11.6" or a 13.3" screen, and may have a 16:9 aspect ratio, and at least 300 nits brightness. Also the display may be of full high definition (HD) resolution (at least 1920×1080p), be compatible with an embedded display port (eDP), and be a low power panel with panel self refresh.

As to touch screen capabilities, the system may provide for a display multi-touch panel that is multi-touch capacitive and being at least 5 finger capable. And in some embodiments, the display may be 10 finger capable. In one embodiment, the touch screen is accommodated within a damage and scratch-resistant glass and coating (e.g., Gorilla Glass™ or Gorilla Glass 2™) for low friction to reduce "finger burn" and avoid "finger skipping". To provide for an enhanced touch experience and responsiveness, the touch panel, in some implementations, has multi-touch functionality, such as less than 2 frames (30 Hz) per static view during pinch zoom, and single-touch functionality of less than 1 cm per frame (30 Hz) with 200 ms (lag on finger to pointer). The display, in some implementations, supports edge-to-edge glass with a minimal screen bezel that is also flush with the panel surface, and limited IO interference when using multi-touch.

For perceptual computing and other purposes, various sensors may be present within the system and may be coupled to processor 610 in different manners. Certain inertial and environmental sensors may couple to processor 610 through a sensor hub 640, e.g., via an I²C interconnect. In the embodiment shown in FIG. 6, these sensors may include an accelerometer 641, an ambient light sensor (ALS) 642, a compass 643 and a gyroscope 644. Other environmental sensors may include one or more thermal sensors 646 which in some embodiments couple to processor 610 via a system management bus (SMBus) bus.

Using the various inertial and environmental sensors present in a platform, many different use cases may be realized. These use cases enable advanced computing operations including perceptual computing and also allow for enhancements with regard to power management/battery life, security, and system responsiveness.

For example with regard to power management/battery life issues, based at least on part on information from an ambient light sensor, the ambient light conditions in a location of the platform are determined and intensity of the display controlled accordingly. Thus, power consumed in operating the display is reduced in certain light conditions.

As to security operations, based on context information obtained from the sensors such as location information, it may be determined whether a user is allowed to access certain secure documents. For example, a user may be permitted to access such documents at a work place or a home location. However, the user is prevented from accessing such documents when the platform is present at a public location. This determination, in one embodiment, is based on location information, e.g., determined via a GPS sensor or camera recognition of landmarks. Other security operations may include providing for pairing of devices within a close range of each other, e.g., a portable platform as described herein and a user's desktop computer, mobile telephone or so forth. Certain sharing, in some implementations, is realized via near field communication when these devices are so paired. However, when the devices exceed a certain range, such sharing may be disabled. Furthermore, when pairing a platform as described herein and a smartphone, an alarm may be configured to be triggered when the devices move more than a predetermined distance from each other, when in a public location. In contrast, when these paired devices are in a safe location, e.g., a work place or home location, the devices may exceed this predetermined limit without triggering such alarm.

Responsiveness may also be enhanced using the sensor information. For example, even when a platform is in a low power state, the sensors may still be enabled to run at a relatively low frequency. Accordingly, any changes in a location of the platform, e.g., as determined by inertial sensors, GPS sensor, or so forth is determined. If no such changes have been registered, a faster connection to a previous wireless hub such as a Wi-Fi™ access point or similar wireless enabler occurs, as there is no need to scan for available wireless network resources in this case. Thus, a greater level of responsiveness when waking from a low power state is achieved.

It is to be understood that many other use cases may be enabled using sensor information obtained via the integrated sensors within a platform as described herein, and the above examples are only for purposes of illustration. Using a system as described herein, a perceptual computing system may allow for the addition of alternative input modalities, including gesture recognition, and enable the system to sense user operations and intent.

In some embodiments one or more infrared or other heat sensing elements, or any other element for sensing the presence or movement of a user may be present. Such sensing elements may include multiple different elements working together, working in sequence, or both. For example, sensing elements include elements that provide initial sensing, such as light or sound projection, followed by sensing for gesture detection by, for example, an ultrasonic time of flight camera or a patterned light camera.

Also in some embodiments, the system includes a light generator to produce an illuminated line. In some embodiments, this line provides a visual cue regarding a virtual boundary, namely an imaginary or virtual location in space, where action of the user to pass or break through the virtual boundary or plane is interpreted as an intent to engage with the computing system. In some embodiments, the illuminated line may change colors as the computing system transitions into different states with regard to the user. The illuminated line may be used to provide a visual cue for the user of a virtual boundary in space, and may be used by the system to determine transitions in state of the computer with regard to the user, including determining when the user wishes to engage with the computer.

In some embodiments, the computer senses user position and operates to interpret the movement of a hand of the user through the virtual boundary as a gesture indicating an intention of the user to engage with the computer. In some embodiments, upon the user passing through the virtual line or plane the light generated by the light generator may change, thereby providing visual feedback to the user that the user has entered an area for providing gestures to provide input to the computer.

Display screens may provide visual indications of transitions of state of the computing system with regard to a user. In some embodiments, a first screen is provided in a first state in which the presence of a user is sensed by the system, such as through use of one or more of the sensing elements.

In some implementations, the system acts to sense user identity, such as by facial recognition. Here, transition to a second screen may be provided in a second state, in which the computing system has recognized the user identity, where this second the screen provides visual feedback to the user that the user has transitioned into a new state. Transition to a third screen may occur in a third state in which the user has confirmed recognition of the user.

In some embodiments, the computing system may use a transition mechanism to determine a location of a virtual boundary for a user, where the location of the virtual boundary may vary with user and context. The computing system may generate a light, such as an illuminated line, to indicate the virtual boundary for engaging with the system. In some embodiments, the computing system may be in a waiting state, and the light may be produced in a first color. The computing system may detect whether the user has reached past the virtual boundary, such as by sensing the presence and movement of the user using sensing elements.

In some embodiments, if the user has been detected as having crossed the virtual boundary (such as the hands of the user being closer to the computing system than the virtual boundary line), the computing system may transition to a state for receiving gesture inputs from the user, where a mechanism to indicate the transition may include the light indicating the virtual boundary changing to a second color.

In some embodiments, the computing system may then determine whether gesture movement is detected. If gesture movement is detected, the computing system may proceed with a gesture recognition process, which may include the use of data from a gesture data library, which may reside in memory in the computing device or may be otherwise accessed by the computing device.

If a gesture of the user is recognized, the computing system may perform a function in response to the input, and return to receive additional gestures if the user is within the virtual boundary. In some embodiments, if the gesture is not recognized, the computing system may transition into an error state, where a mechanism to indicate the error state may include the light indicating the virtual boundary changing to a third color, with the system returning to receive additional gestures if the user is within the virtual boundary for engaging with the computing system.

As mentioned above, in other embodiments the system can be configured as a convertible tablet system that can be used in at least two different modes, a tablet mode and a notebook mode. The convertible system may have two panels, namely a display panel and a base panel such that in the tablet mode the two panels are disposed in a stack on top of one another. In the tablet mode, the display panel faces outwardly and may provide touch screen functionality as found in conventional tablets. In the notebook mode, the two panels may be arranged in an open clamshell configuration.

In various embodiments, the accelerometer may be a 3-axis accelerometer having data rates of at least 50 Hz. A gyroscope may also be included, which can be a 3-axis gyroscope. In addition, an e-compass/magnetometer may be present. Also, one or more proximity sensors may be provided (e.g., for lid open to sense when a person is in proximity (or not) to the system and adjust power/performance to extend battery life). For some OS's Sensor Fusion capability including the accelerometer, gyroscope, and compass may provide enhanced features. In addition, via a sensor hub having a real-time clock (RTC), a wake from sensors mechanism may be realized to receive sensor input when a remainder of the system is in a low power state.

In some embodiments, an internal lid/display open switch or sensor to indicate when the lid is closed/open, and can be used to place the system into Connected Standby or automatically wake from Connected Standby state. Other system sensors can include ACPI sensors for internal processor, memory, and skin temperature monitoring to enable changes to processor and system operating states based on sensed parameters.

In an embodiment, the OS may be a Microsoft® Windows® 8 OS that implements Connected Standby (also referred to herein as Win8 CS). Windows 8 Connected Standby or another OS having a similar state can provide, via a platform as described herein, very low ultra idle power to enable applications to remain connected, e.g., to a cloud-based location, at very low power consumption. The platform can supports 3 power states, namely screen on (normal); Connected Standby (as a default "off" state); and shutdown (zero watts of power consumption). Thus in the Connected Standby state, the platform is logically on (at minimal power levels) even though the screen is off. In such a platform, power management can be made to be transparent to applications and maintain constant connectivity, in part due to offload technology to enable the lowest powered component to perform an operation. In embodiments, a power delivery controller operating under a Microsoft® Windows® OS may be shared such that power is provided to peripheral devices according to the present techniques.

Also seen in FIG. 6, various peripheral devices may couple to processor 610 via a low pin count (LPC) interconnect. In the embodiment shown, various components can be coupled through an embedded controller 635. Such components can include a keyboard 636 (e.g., coupled via a PS2 interface), a fan 637, and a thermal sensor 639. In some embodiments, touch pad 630 may also couple to EC 635 via a PS2 interface. In addition, a security processor such as a trusted platform module (TPM) 638 in accordance with the Trusted Computing Group (TCG) TPM Specification Version 1.2, dated Oct. 2, 2003, may also couple to processor 610 via this LPC interconnect. However, understand the scope of the present techniques is not limited in this regard and secure processing and storage of secure information may be in another protected location such as a static random access memory (SRAM) in a security coprocessor, or as encrypted data blobs that are only decrypted when protected by a secure enclave (SE) processor mode. In some cases, the devices connected via the LPC interconnect can share a power delivery controller as described herein.

In a particular implementation, peripheral ports may include a high definition media interface (HDMI) connector (which can be of different form factors such as full size, mini or micro); one or more USB ports, such as full-size external ports in accordance with the Universal Serial Bus Revision 3.0 Specification (November 2008), with each port able to be powered for charging of USB devices (such as smartphones) when the system is in Connected Standby state and is plugged into AC wall power. Each port may share a power delivery controller as described herein. In addition, one or more Thunderbolt™ ports can be provided. Other ports may include an externally accessible card reader such as a full size SD-XC card reader and/or a SIM card reader for WWAN (e.g., an 8 pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System 600 can communicate with external devices in a variety of manners, including wirelessly. In the embodiment shown in FIG. 6, various wireless modules, each of which can correspond to a radio configured for a particular wireless communication protocol, are present. One manner for wireless communication in a short range such as a near field may be via a near field communication (NFC) unit 645 which may communicate, in one embodiment with processor 610 via an SMBus. Note that via this NFC unit 645, devices in close proximity to each other can communicate. For example, a user can enable system 600 to communicate with another (e.g.,) portable device such as a smartphone of the user via adapting the two devices together in close relation and enabling transfer of information such as identification information payment information, data such as image data or so forth. Wireless power transfer may also be performed using a NFC system.

Using the NFC unit described herein, users can bump devices side-to-side and place devices side-by-side for near field coupling functions (such as near field communication and wireless power transfer (WPT)) by leveraging the coupling between coils of one or more of such devices. More specifically, embodiments provide devices with strategically shaped, and placed, ferrite materials, to provide for better coupling of the coils. Each coil has an inductance associated with it, which can be chosen in conjunction with the resistive, capacitive, and other features of the system to enable a common resonant frequency for the system.

As further seen in FIG. 6, additional wireless units can include other short range wireless engines including a WLAN unit 650 and a Bluetooth unit 652. Using WLAN unit 650, Wi-Fi™ communications in accordance with a given Institute of Electrical and Electronics Engineers (IEEE) 802.11 standard can be realized, while via Bluetooth unit 652, short range communications via a Bluetooth protocol can occur. These units may communicate with processor 610 via, e.g., a USB link or a universal asynchronous receiver transmitter (UART) link. Or these units may couple to processor 610 via an interconnect according to a Peripheral Component Interconnect Express™ (PCIe™) protocol, e.g., in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit 656 which in turn may couple to a subscriber identity module (SIM) 657. In addition, to enable receipt and use of location information, a GPS module 655 may also be present. Note that in the embodiment shown in FIG. 6, WWAN unit 656 and an integrated capture device such as a camera module 654 may communicate via a given USB protocol such as a USB 2.0 or 3.0 link, or a UART or I²C protocol. Again the actual physical connection of these units can be via adaptation of a NGFF add-in card to an NGFF connector configured on the motherboard.

In a particular embodiment, wireless functionality can be provided modularly, e.g., with a WiFi™ 802.11 ac solution (e.g., add-in card that is backward compatible with IEEE 802.11 abgn) with support for Windows 8 CS. This card can be configured in an internal slot (e.g., via an NGFF adapter). An additional module may provide for Bluetooth capability (e.g., Bluetooth 4.0 with backwards compatibility) as well as Intel® Wireless Display functionality. In addition NFC support may be provided via a separate device or multifunction device, and can be positioned as an example, in a front right portion of the chassis for easy access. A still additional module may be a WWAN device that can provide support for 3G/4G/LTE and GPS. This module can be implemented in an internal (e.g., NGFF) slot. Integrated antenna support can be provided for WiFi™, Bluetooth, WWAN, NFC and GPS, enabling seamless transition from WiFi™ to WWAN radios, wireless gigabit (WiGig) in accordance with the Wireless Gigabit Specification (July 2010), and vice versa.

As described above, an integrated camera can be incorporated in the lid. As one example, this camera can be a high resolution camera, e.g., having a resolution of at least 2.0 megapixels (MP) and extending to 6.0 MP and beyond.

To provide for audio inputs and outputs, an audio processor can be implemented via a digital signal processor (DSP) 660, which may couple to processor 610 via a high definition audio (HDA) link. Similarly, DSP 660 may communicate with an integrated coder/decoder (CODEC) and amplifier 662 that in turn may couple to output speakers 663 which may be implemented within the chassis. Similarly, amplifier and CODEC 662 can be coupled to receive audio inputs from a microphone 665 which in an embodiment can be implemented via dual array microphones (such as a digital microphone array) to provide for high quality audio inputs to enable voice-activated control of various operations within the system. Note also that audio outputs can be provided from amplifier/CODEC 662 to a headphone jack 664. Although shown with these particular components in the embodiment of FIG. 6, understand the scope of the present techniques is not limited in this regard.

In a particular embodiment, the digital audio codec and amplifier are capable of driving the stereo headphone jack, stereo microphone jack, an internal microphone array and stereo speakers. In different implementations, the codec can be integrated into an audio DSP or coupled via an HD audio path to a peripheral controller hub (PCH). In some implementations, in addition to integrated stereo speakers, one or more bass speakers can be provided, and the speaker solution can support DTS audio.

In some embodiments, processor 610 may be powered by an external voltage regulator (VR) and multiple internal voltage regulators that are integrated inside the processor die, referred to as fully integrated voltage regulators (FIVRs). The use of multiple FIVRs in the processor enables the grouping of components into separate power planes, such that power is regulated and supplied by the FIVR to only those components in the group. During power management, a given power plane of one FIVR may be powered down or off when the processor is placed into a certain low power state, while another power plane of another FIVR remains active, or fully powered.

In one embodiment, a sustain power plane can be used during some deep sleep states to power on the I/O pins for several I/O signals, such as the interface between the processor and a PCH, the interface with the external VR and the interface with EC 635. This sustain power plane also powers an on-die voltage regulator that supports the on-board SRAM or other cache memory in which the processor context is stored during the sleep state. The sustain power plane is also used to power on the processor's wakeup logic that monitors and processes the various wakeup source signals.

During power management, while other power planes are powered down or off when the processor enters certain deep sleep states, the sustain power plane remains powered on to support the above-referenced components. However, this can lead to unnecessary power consumption or dissipation when those components are not needed. To this end, embodiments may provide a connected standby sleep state to maintain processor context using a dedicated power plane. In one embodiment, the connected standby sleep state facilitates processor wakeup using resources of a PCH which itself may be present in a package with the processor. In one embodiment, the connected standby sleep state facilitates sustaining processor architectural functions in the PCH until processor wakeup, this enabling turning off all of the unnecessary processor components that were previously left powered on during deep sleep states, including turning off all of the clocks. In one embodiment, the PCH contains a time stamp counter (TSC) and connected standby logic for controlling the system during the connected standby state. The integrated voltage regulator for the sustain power plane may reside on the PCH as well.

In an embodiment, during the connected standby state, an integrated voltage regulator may function as a dedicated power plane that remains powered on to support the dedicated cache memory in which the processor context is stored such as critical state variables when the processor enters the deep sleep states and connected standby state. This critical state may include state variables associated with the architectural, micro-architectural, debug state, and/or similar state variables associated with the processor.

The wakeup source signals from EC 635 may be sent to the PCH instead of the processor during the connected standby state so that the PCH can manage the wakeup processing instead of the processor. In addition, the TSC is maintained in the PCH to facilitate sustaining processor architectural functions. Although shown with these particular components in the embodiment of FIG. 6, understand the scope of the present techniques is not limited in this regard.

Power control in the processor can lead to enhanced power savings. For example, power can be dynamically allocate between cores, individual cores can change frequency/voltage, and multiple deep low power states can be provided to enable very low power consumption. In addition, dynamic control of the cores or independent core portions can provide for reduced power consumption by powering off components when they are not being used.

Some implementations may provide a specific power management IC (PMIC) to control platform power. Using this solution, a system may see very low (e.g., less than 5%) battery degradation over an extended duration (e.g., 16 hours) when in a given standby state, such as when in a Win8 Connected Standby state. In a Win8 idle state a battery life exceeding, e.g., 9 hours may be realized (e.g., at 150 nits). As to video playback, a long battery life can be realized, e.g., full HD video playback can occur for a minimum of 6 hours. A platform in one implementation may have an energy capacity of, e.g., 35 watt hours (Whr) for a Win8 CS using an SSD and (e.g.,) 40-44 Whr for Win8 CS using an HDD with a RST cache configuration.

A particular implementation may provide support for 15 W nominal CPU thermal design power (TDP), with a configurable CPU TDP of up to approximately 25 W TDP design point. The platform may include minimal vents owing to the thermal features described above. In addition, the platform is pillow-friendly (in that no hot air is blowing at the user). Different maximum temperature points can be realized depending on the chassis material. In one implementation of a plastic chassis (at least having to lid or base portion of plastic), the maximum operating temperature can be 52 degrees Celsius (C). And for an implementation of a metal chassis, the maximum operating temperature can be 46° C.

In different implementations, a security module such as a TPM can be integrated into a processor or can be a discrete device such as a TPM 2.0 device. With an integrated security module, also referred to as Platform Trust Technology (PTT), BIOS/firmware can be enabled to expose certain hardware features for certain security features, including secure instructions, secure boot, Intel® Anti-Theft Technology, Intel® Identity Protection Technology, Intel® Trusted Execution Technology (TXT), and Intel® Manageability Engine Technology along with secure user interfaces such as a secure keyboard and display.

Figure 7:
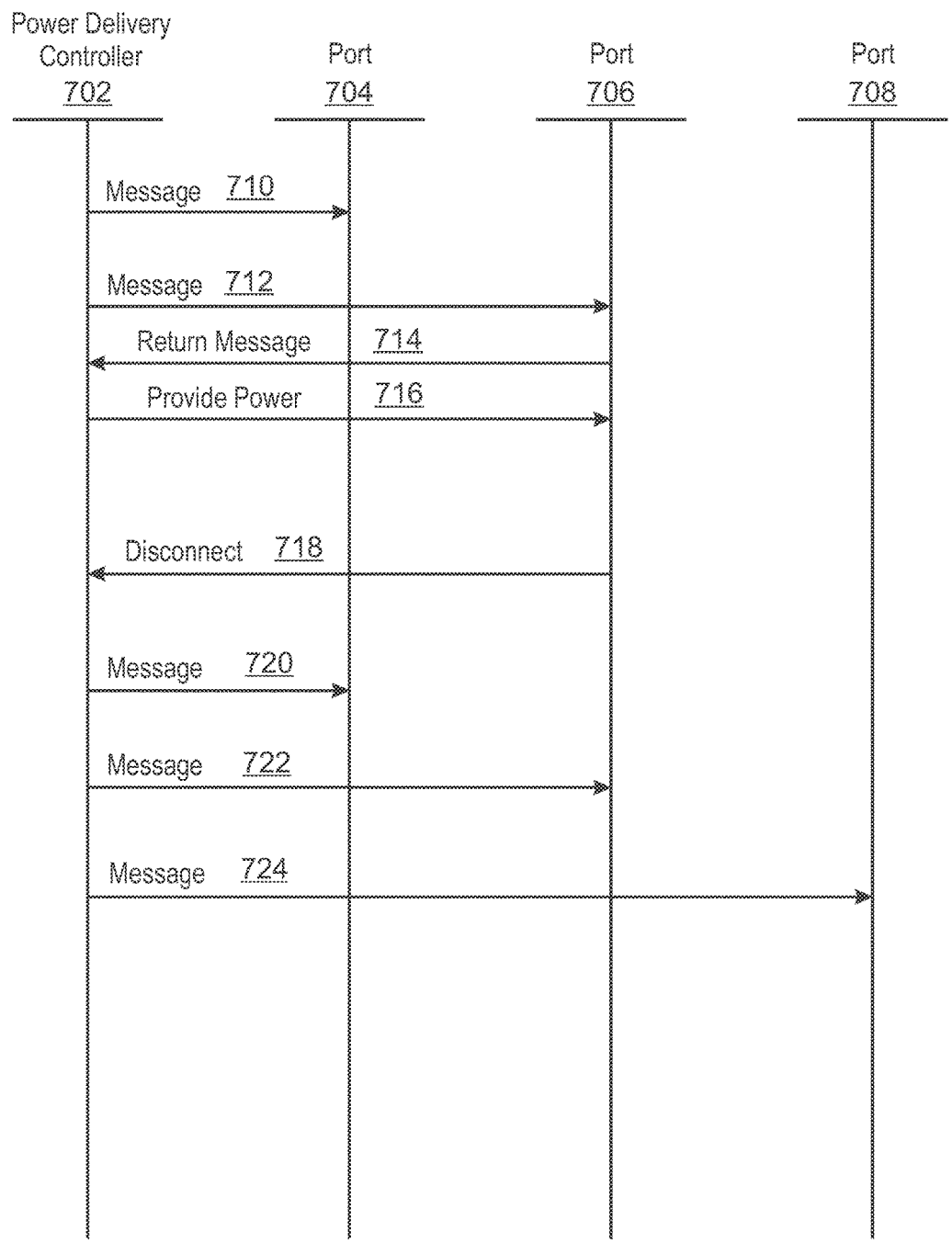
FIG. 7 is a protocol flow diagram illustrating message flow between a power delivery controller and a plurality of ports.

FIG. 7 is a protocol flow diagram 700 illustrating message flow between a power delivery controller 702 and a plurality of ports. In FIG. 7, a port 704, a port 706 and a port 708 each communicate with and share the power delivery (PD) controller 702.

The PD Controller 702 may rotate between the plurality of ports 704, 706, and 708 in order to determine which port has a device connect that is to draw power via the PD controller 702. For example, the PD Controller 702 sends a message to port 704 at reference number 710. The message can be any message that is to generate a response from the port when a device is connected. After a period of time, if no response is received from the port 704, the PD Controller 702 sends a message to the port 706 at reference number 712. In this example, port 706 sends a return message indicating a device is attached to the port 706 and is requesting power at reference number 714. The USB PD controller remains attached to the port for a period of time and provides power to the device attached via port 706, as illustrated at reference number 716.

At reference number 718, the port 706 sends a message to the PD controller 702 that indicates the device connected to the port 706 has been disconnected. In some cases, the device is disconnected after a BadCRC message. The PD controller 702 then begins to poll each port by sending messages to each port. Accordingly, at reference number 720, the PD controller 702 sends a message to port 704. After a period with no response, the PD controller 702 sends a message to port 706 at reference number 722. After an additional period with no response, the PD controller 702 sends a message to port 708 at reference number 724. The particular order in which the PD controller 702 sends a message to each port is for exemplary purposes only. The PD controller 702 can rotate through the plurality of ports in any fashion.

Figure 8:
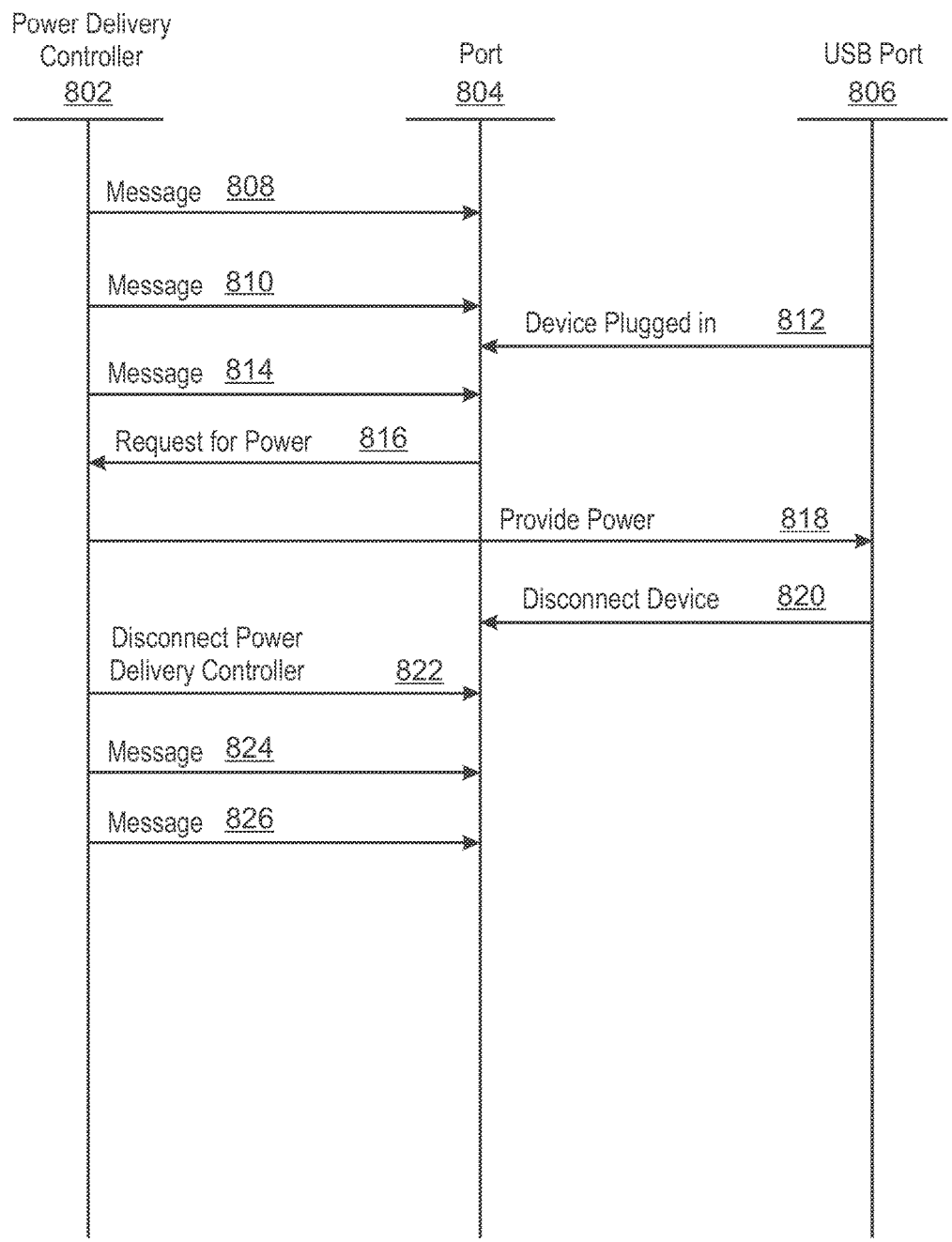
FIG. 8 is a protocol flow diagram illustrating message flow between a power delivery controller, a port, and a device.

FIG. 8 is a protocol flow diagram 800 illustrating message flow between a power delivery controller, a port, and a device. In FIG. 8, a port 804, and a device 806 are illustrated.

The PD Controller 802 may rotate between a plurality of ports, including the port 804. As a result, the port 804 receives periodic messages from the PD controller 802. As discussed above, the message can be any message that is to generate a response from the port when a device is connected. Accordingly, a message 808 is sent to the port 804. No response is sent to the PD controller 802, so another message 810 is sent to the port. The PD controller continues to poll other ports as no response was received from the port 804. At reference number 812, a USB device 806 is plugged in to the port 804. For purposes of this example, device 804 also requests power. When the next message 814 is sent by the PD controller 802, the port 804 sends along a request for power at reference number 816. The PD controller 802 then provides power to the USB device 806 at reference number 818.

At reference number 820, the USB device 806 is disconnected from the port 804. In some cases, the device is disconnected after a BadCRC message. At reference number 822, the PD controller 802 is disconnected from the port 804. The PD controller then proceeds to poll the ports by sending messages to each port. Thus, the port 804 receives a message at reference number 824 and reference number 826.

After a period of time, if no response is received from the port 804, the PD Controller 802 sends a message to the port 806 at reference number 812. In this example, port 806 sends a return message indicating a device is attached to the port 806 and is requesting power at reference number 814. The USB PD controller remains attached to the port for a period of time and provides power to the device attached via port 806, as illustrated at reference number 816.

Figure 9:
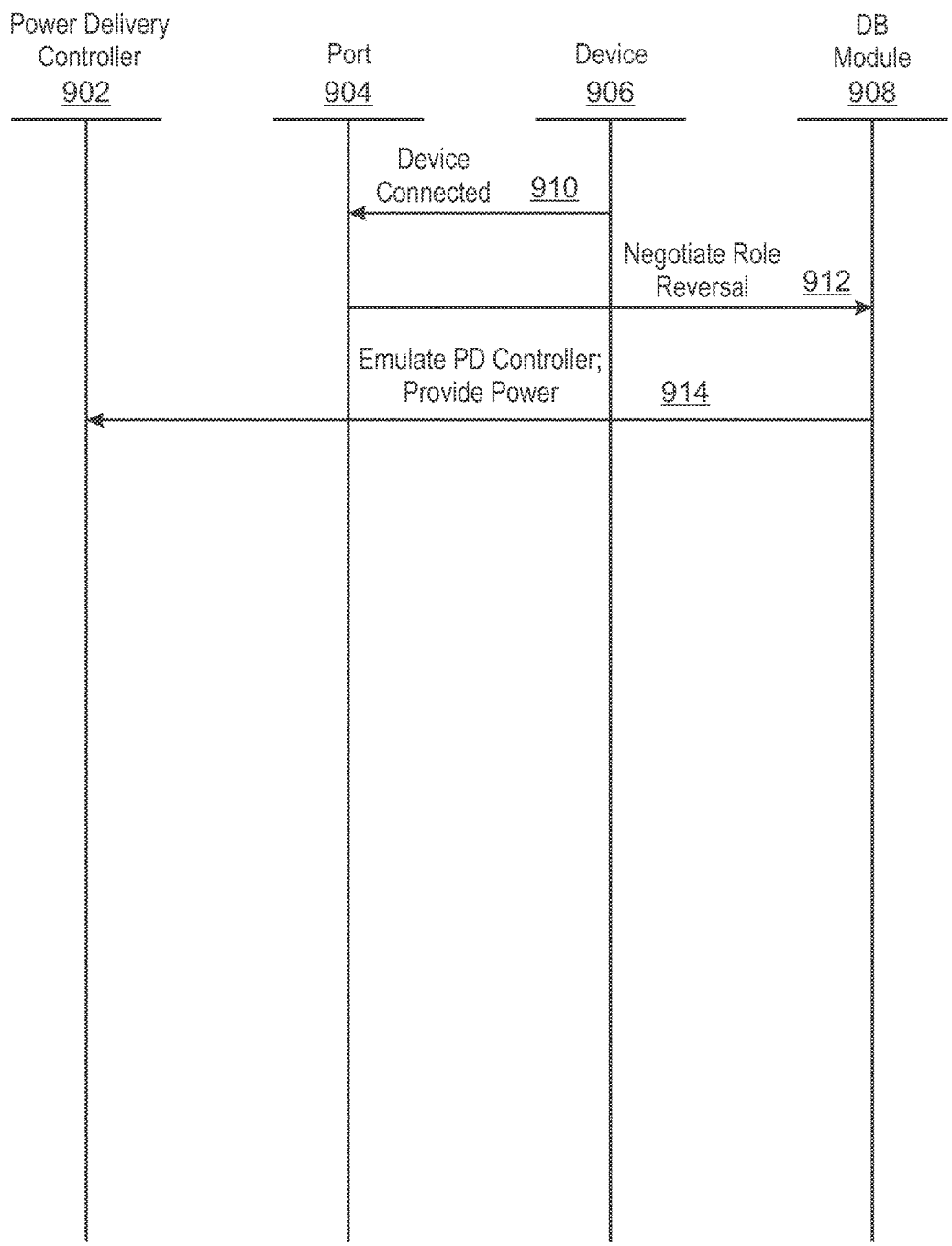
FIG. 9 is a protocol flow diagram illustrating message flow between a power delivery controller, a port, a device, and a dead battery or unpowered module.

FIG. 9 is a protocol flow diagram 900 illustrating message flow between a power delivery controller 902, a port 904, a device 906, and a dead battery (DB) module 908. At reference number 910, the device 906 is connected to the port 904. Through the port 904, the device 906 negotiates role reversal with the DB module 908 at reference number 912. The DB module 908 coupled with the device 906 through the port 904 can use a limited voltage on $V_{Bus}$ to output a bit stream for negotiation purposes when the role reversal is established. At reference number 914, the DB module 908 emulates a minimal portion of the USB PD controller 902 that is necessary to support dead battery operation and provides power to a device including the PD controller 902.

Example 1

A system for sharing a power delivery controller is described herein. The system includes a plurality of ports and a power delivery controller. The power delivery controller is communicatively coupled to the plurality of ports, and the power delivery controller is to send a first message to a particular port of the plurality of ports. The power delivery controller is to also remain connected to the particular port and enable power delivery to the particular port in response to a particular return message from the port.

The plurality of ports may be connected to a cable, or the plurality of ports is connected to a plurality of devices. The return message may be GoodCRC message, or the return message may be a Request message. A plurality of dead battery (DB) modules may correspond to each of the plurality of ports, wherein each DB module is to enable charging of the system. The DB modules may emulate a minimal portion of a USB PD controller to support dead battery operation. Additionally, the system may be a Consumer/Provider and can transmit power via the single power delivery controller coupled to the particular port of the plurality of ports. The system may be a Provider/Consumer, and may receive power via the power delivery controller, a dead battery (DB module), and any port of the plurality of ports. A second power delivery controller may be communicatively coupled to the plurality of ports, and the power delivery controller or the second power delivery controller may be connected to the particular port.

Example 2

A method for sharing a power delivery controller is described herein. Although a method is described, the method may be implemented by a means in an apparatus or by executing code, such as code stored on a computer readable medium. The method includes polling a plurality of Universal Serial Bus (USB) ports and sending a first message to each port of the plurality of USB ports. The method also includes coupling to a port of the plurality of ports in response to a return message from the port, wherein power is delivered to the port.

The plurality of ports may be a group of ports connected to a plurality of cables. The plurality of ports may also be a group of ports connected to a device plurality of devices. The return message may be a GoodCRC message, or the return message can be a Request message. Back charging can be established using an unpowered module associated with each USB port. The unpowered module may emulate a minimal portion of a Universal Serial Bus Power Delivery controller to support dead battery operation. Additionally, the port may be coupled with a Consumer/Provider device that is to provide power to a system including the power delivery controller. The first message can be any message that generates a response from the port. Further, the first message may be a Ping or Capabilities message.

Example 3

A tangible, non-transitory, computer-readable medium is described herein. The tangible, non-transitory, computer-readable medium comprises code to direct a processor to send a first message to a particular port of a plurality of ports, and couple to the particular port of the plurality of ports in response to a return message from the port. The code may also direct the processor to deliver power is to the particular port.

The processor may be a power delivery controller, and the power delivery controller may send a message to the plurality of ports, and couple with a port in response to a device requesting power at the port. The plurality of ports may be a group of ports connected to a plurality of cables. The plurality of ports may also be a group of ports connected to a plurality of devices. Additionally, the return message may be a GoodCRC message, or the return message may be a Request message. The particular port may be coupled with a Consumer/Provider device that is to provide power to a system including the power delivery controller. The first message may be any message that generates a response from the port. Additionally, the first message may be a Ping or Capabilities message.

Example 4

An apparatus is described herein. The apparatus includes a means to send a first message to a plurality of ports, wherein the first message is sent to a particular port of the plurality of ports, and in response to the first message a return message is sent from the particular port to the means to send the first message to the plurality of ports. The apparatus also includes a means to deliver power to the particular port in response to the return message.

The means to send the first message to the plurality of ports may be a power delivery controller, and the power delivery controller can send the first message to the plurality of ports, and couple with the particular port in response to a device requesting power at the particular port. The plurality of ports may be a group of ports connected to a plurality of cables. The plurality of ports may be group of ports connected to a plurality of devices. The return message is a GoodCRC message, or the return message may be a Request message. The particular port may be coupled with a Consumer/Provider device that is to provide power to a system including the power delivery controller. The first message may be any message that generates a response from the port. Further, the first message may be a Ping or Capabilities message.

Example 5

An apparatus for sharing a power delivery controller is described herein. The apparatus includes a power delivery controller communicatively coupled to a Universal Serial Bus port, wherein the USB port corresponds to an unpowered module. The unpowered module is to receive a small voltage from a device to restore power delivery communications capability of a system in response to no voltage being detected. The unpowered module is to also output a bit stream to the device using the small voltage until the system is ready to resume normal power delivery communications.

The bit stream may be output to the device from the unpowered module until a battery of the system is charged. Also, the bit stream may be a repeating bit pattern. The unpowered module may emulate a minimal portion of the power delivery controller to support a dead battery operation, and the minimal portion may be twenty-three megahertz source used to generate the bit stream. The twenty-three megahertz source may be modulated at substantially three hundred kilohertz rate to drive a six hundred kilohertz frequency shift. Additionally, the unpowered module may be a twenty-three megahertz source used to generate the bit stream. The small voltage may charge a battery of the system or provide continuous power to the system. The unpowered module may access a $V_{bus}$ associated with the Universal Serial Bus port to enable signaling to establish the transmission of power. Moreover, the power delivery controller may communicatively couple to a particular port of a plurality of Universal Serial Bus ports and is to provide power to any port of the plurality of USB ports.

Example 6

A method for backing charging is described herein. Although a method is described, the method may be implemented by a means in an apparatus or by executing code, such as code stored on a computer readable medium. The method includes receiving a small voltage at an unpowered module from a device to restore power delivery communications capability of a system in response to no voltage being detected. The method also includes outputting a bit stream to the device from the unpowered module using the small voltage until the system is ready to resume normal power delivery communications.

The bit stream may be output to the device from the unpowered module until a battery of the system is charged. Also, the bit stream may be a repeating bit pattern. The unpowered module may emulate a minimal portion of a power delivery controller to support a dead battery operation. The minimal portion may be a twenty-three megahertz source used to generate the bit stream. Further, the twenty-three megahertz source may be modulated at substantially three hundred kilohertz rate to drive a six hundred kilohertz frequency shift. The unpowered module may be a twenty-three megahertz source used to generate the bit stream. The small voltage can charge a battery of the system or provide continuous power to the system. The unpowered module may access a $V_{bus}$ associated with the Universal Serial Bus port to enable signaling to establish the transmission of power. The power delivery controller can communicatively couple to a particular port of a plurality of Universal Serial Bus ports and is to provide power to any port of the plurality of USB ports.

Example 7

A tangible, non-transitory, computer readable medium is described herein. The tangible, non-transitory, computer readable medium comprises code to direct a processor to receive a small voltage at an unpowered module from a device to restore power delivery communications capability of a system in response to no voltage being detected. The code also directs the processor to output a bit stream to the device from the unpowered module using the small voltage until the system is ready to resume normal power delivery communications.

The device can send the small voltage on a $V_{bus}$ to restore power delivery communications capability. The bit stream may be output to the device from the unpowered module until a battery of the system is charged. The bit stream can be a repeating bit pattern. The unpowered module may emulate a minimal portion of a power delivery controller to support a dead battery operation. The minimal portion may be a twenty-three megahertz source used to generate the bit stream. Additionally, the twenty-three megahertz source may be modulated at substantially three hundred kilohertz rate to drive a six hundred kilohertz frequency shift. The unpowered module can be a twenty-three megahertz source used to generate the bit stream. Further, the unpowered module may access a $V_{bus}$ associated with the USB port to enable signaling to establish the transmission of power. Back charging may be established using the unpowered module, where the unpowered module is one of a plurality of unpowered modules associated with a plurality of Universal Serial Bus ports.

Example 8

An apparatus for back-charging is described herein. The apparatus includes a means to receive a small voltage from a device to restore power delivery communications capability of a system in response to no voltage being detected and output a bit stream to the device using the small voltage until the system is ready to resume normal power delivery communications.

The device can send the small voltage on a Vbus to restore power delivery communications capability. The bit stream may be output to the device from the means to receive a small voltage from a device until a battery of the system is charged. The bit stream may be a repeating bit pattern. Additionally, the means to receive a small voltage from a device may emulate a minimal portion of a power delivery controller to support a dead battery operation. The minimal portion may be a twenty-three megahertz source used to generate the bit stream. The twenty-three megahertz source may be modulated at substantially a three hundred kilohertz rate to drive a six hundred kilohertz frequency shift. Further, the means may be a twenty-three megahertz source used to generate the bit stream. The means to receive a small voltage from a device may access a Vbus associated with the USB port to enable signaling to establish the transmission of power. Back charging may be established using the means to receive a small voltage from a device, where the means to receive a small voltage from a device is one of a plurality of means to receive a small voltage from a device associated with a plurality of Universal Serial Bus ports.

Example 9

A device for receiving power is described herein. When the device is connected to a system including a single power delivery controller, the device is to receive a first message from the power delivery controller and request power from the power delivery controller in response to the first message. The device is to also connect to the power delivery controller to receive power and send a second message to the power delivery controller to disconnect from the power delivery controller. The first message may be a capabilities message or a ping. The request for power from the power delivery controller MAY be made using a GoodCRC message. The request for power from the power delivery controller may also be made using a Request message. The second message may be a BadCRC message.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A system for sharing a power delivery controller, comprising:
    a plurality of ports; and
    a power delivery controller communicatively coupled to the plurality of ports, and the power delivery controller is to:
        rotate between the plurality of ports to determine a particular port of the plurality of ports that has access to the power delivery controller;
        negotiate with the plurality of ports by advertising capabilities of a computing device that comprises the power delivery controller and the plurality of ports at each port of the plurality of ports;
        send a first message to the particular port of the plurality of ports; and
        remain connected to the particular port and enable power delivery to the particular port in response to a particular return message from the port.

2. The system of claim 1, wherein the plurality of ports is connected to a cable.

3. The system of claim 1, wherein the plurality of ports is connected to a plurality of devices.

4. The system of claim 1, wherein the return message is a GoodCRC message.

5. The system of claim 1; wherein the return message is a Request message.

6. The system of claim 1, comprising a plurality of dead battery (DB) modules corresponding to each of the plurality of ports, wherein each DB module is to enable charging of the system.

7. The system of claim 6, wherein the DB modules are to emulate a minimal portion of a USB PD controller to support dead battery operation.

8. The system of claim 1, wherein a second power delivery controller is communicatively coupled to the plurality of ports, and the power delivery controller or the second power delivery controller are connected to the particular port.

9. A method for sharing a power delivery controller, comprising:
    polling a plurality of Universal Serial Bus (USB) ports by rotating between the plurality of ports to determine a particular port of the plurality of ports that has access to the power delivery controller;
    negotiating with the plurality of ports by advertising capabilities of a computing device that comprises the power delivery controller and the plurality of ports at each port of the plurality of ports;
    sending a first message to each port of the plurality of USB ports; and
    coupling to a particular port of the plurality of ports in response to a return message from the particular port, wherein power is delivered to the particular port.

10. The method of claim 9, wherein the plurality of ports is a group of ports connected to a plurality of cables.

11. The method of claim 9, wherein the plurality of ports is a group of ports connected to a device plurality of devices.

12. The method of claim 9, wherein the return message is a GoodCRC message.

13. The method of claim 9; wherein the return message is a Request message.

14. A tangible, non-transitory, computer-readable medium comprising code to direct a processor to:
    rotate between a plurality of ports to determine a particular port of the plurality of ports that has access to the power delivery controller;
    negotiate with the plurality of ports by advertising capabilities of a computing device that comprises a power delivery controller and the plurality of ports at each port of the plurality of ports;
    send a first message to the particular port of the plurality of ports;
    couple to the particular port of the plurality of ports in response to a return message from the port; and
    deliver power to the particular port.

15. The computer-readable medium of claim 14, wherein the processor is a power delivery controller.

16. The computer-readable medium of claim 14, wherein the processor is a power delivery controller and the power delivery controller is to send a message to the plurality of ports, and couple with a port in response to a device requesting power at the port.

17. The computer-readable medium of claim 14, wherein the plurality of ports is a group of ports connected to a plurality of cables.

18. The computer-readable medium of claim 14, wherein the plurality of ports is a group of ports connected to a plurality of devices.

19. The computer-readable medium of claim 14, wherein the return message is a GoodCRC message.

20. The computer-readable medium of claim 14; wherein the return message is a Request message.

* * * * *